United States Patent
Mears et al.

(10) Patent No.: US 12,554,596 B2
(45) Date of Patent: Feb. 17, 2026

(54) TEMPORARY LOCAL PROTECTION AGAINST DATA LOSS WHEN A NODE FAILS IN A DISTRIBUTED STORAGE SYSTEM

(71) Applicant: NetApp, Inc., San Jose, CA (US)

(72) Inventors: Morgan Mears, Raleigh, NC (US); Samuel Fink, Cary, NC (US); Kyle Grygo, Pittsburgh, PA (US)

(73) Assignee: NetApp, Inc., San Jose, CA (US)

( * ) Notice: Subject to any disclaimer, the term of this patent is extended or adjusted under 35 U.S.C. 154(b) by 66 days.

(21) Appl. No.: 18/420,064

(22) Filed: Jan. 23, 2024

(65) Prior Publication Data

US 2025/0238330 A1 Jul. 24, 2025

(51) Int. Cl.
*G06F 11/00* (2006.01)
*G06F 11/1446* (2026.01)

(52) U.S. Cl.
CPC .................. *G06F 11/1469* (2013.01)

(58) Field of Classification Search
CPC ............. G06F 11/1446; G06F 11/1458; G06F 11/1464; G06F 11/2056; G06F 11/2094
See application file for complete search history.

(56) References Cited

U.S. PATENT DOCUMENTS

| | | | | |
|---|---|---|---|---|
| 2014/0359342 A1* | 12/2014 | Feder | .................. | G06F 11/1458 714/4.11 |
| 2015/0186411 A1* | 7/2015 | Iliadis | ................. | H04L 67/1097 707/637 |
| 2015/0254140 A1* | 9/2015 | Harnik | ................ | G06F 11/1461 714/19 |
| 2015/0370656 A1* | 12/2015 | Tsafrir | ................ | G06F 11/2094 714/6.3 |
| 2021/0357291 A1* | 11/2021 | Xiang | ................... | G06F 3/0619 |

* cited by examiner

*Primary Examiner* — Marc Duncan

(57) ABSTRACT

The technology disclosed herein enhances data protection in a distributed storage system. In a particular example, a method includes determining a drive in a subject node of the distributed storage system has failed while storing first data of a data set distributed across nodes of the distributed storage system by a data protection mechanism. The method further includes broadcasting failure information indicating the data set from the subject node to other nodes of the distributed storage system. At the other nodes, in response to receiving the failure information, the method includes identifying a subset of the other nodes that also store a portion of the data set. In each identified node of the subset, the method includes identifying second data of the data set stored on a local drive and copying the second data to a different local drive to protect the data set from further drive failure.

20 Claims, 12 Drawing Sheets

| DATA SET MAPPING TABLE 900 | |
|---|---|
| DATA SET | NODES |
| 741 | 701, 704, 705, 706 |
| 742 | 701, 702, 706, 708 |
| ... | ... |

| DRIVE MAPPING TABLE 901 | |
|---|---|
| DATA SET | DRIVE |
| 741 | 711 |
| 742 | 711 |
| ... | ... |

FIG. 9

TEMPORARY LOCAL PROTECTION AGAINST DATA LOSS WHEN A NODE FAILS IN A DISTRIBUTED STORAGE SYSTEM

TECHNICAL FIELD

Data protection for distributed storage systems where data is distributed across multiple nodes.

BACKGROUND

Distributed storage systems, such as StorageGRID® from NetApp®, store data in multiple locations, which may be in different areas of the world. Each location is commonly referred to as a node of the distributed storage system. The distributed storage system uses a file system that spans the nodes. As such, data objects can be stored to and accessed from any node regardless of whether the node being contacted itself stores the object. For example, a computing system may request access to a data object from a node closest geographically to the computing system. That node will provide the data to the requesting system even if the node must retrieve the requested data from another node.

Data protection is important even in a distributed storage system. Minimizing the storage overhead needed to meet given data durability and availability requirements is desirable to save on costs especially at scale. However, storage overhead employed by the system still needs to keep data from being lost or becoming temporarily unavailable if either individual storage devices (e.g., Hard Disk Drives (HDDs) or Solid-State Drives (SSDs)), or storage nodes comprising compute elements and a collection of one or more individual storage devices, fail permanently or become temporarily inaccessible.

In a practical example, a potential purchaser of a distributed storage system will typically have requirements on availability, durability, capacity, and cost. For instance, the requirements may include 1) data must remain available when any two storage nodes are unavailable ("down") for any reason, 2) tolerance for data loss is 0.0000000001% chance of permanent data loss (100%–0.000000001%=99.999999999% or "11 9s" durability), 3) X terabytes/petabytes/exabytes of data will need to be stored, and 4) the customer will typically want that storage to be a cheap as possible.

SUMMARY

The technology disclosed herein enables enhanced data protection when a drive fails in a node of a distributed storage system. In a particular example, a method includes determining a drive in a subject node of the distributed storage system has failed. The drive stores first data of a data set distributed across nodes of the distributed storage system by a data protection mechanism. The method further includes broadcasting failure information from the subject node to other nodes of the distributed storage system. The failure information indicates the data set. At the other nodes, in response to receiving the failure information, the method includes identifying a subset of the other nodes that also store a portion of the data set. In each identified node of the subset, the method includes identifying second data of the data set stored on a local drive of the identified node and creating a copy of the second data on a second local drive to protect the data set from failure of the first local drive.

In other examples, an apparatus performs the above-recited methods and computer readable storage media directs a processing system to perform the above-recited methods.

BRIEF DESCRIPTION OF THE DRAWINGS

FIG. 9 illustrates mapping tables for protecting data stored across nodes in a distributed storage system when a node fails.

DETAILED DESCRIPTION

The cost of goods for a purchaser of a distributed storage system is dominated by the cost of storage media. When a given amount of data is to be stored, the purchaser will not want to pay for the cost of storage media above and beyond what is necessary to store the given amount of data. However, more storage media is necessary to ensure data remains accessible when one or more nodes of the distributed storage system are unavailable and that the data remains adequately protected from drive or node failure (i.e., has adequate durability for the data). The ratio of the amount of storage necessary to achieve the above accessibility and protection goals to the given amount of data to be stored is commonly referred to as the "storage efficiency" of the solution. In a simple example, a 4-disk Redundant Array of Independent Disks (RAID) 4 or RAID5 configuration has a storage efficiency of 75%. Three data disks of space usable by the customer, plus one parity disk of space that is not usable by the customer because the system uses it to achieve required durability/availability given known MTBF (Mean Time Between Failures) or AFR (Annual Failure Rate) probabilities for the disk hardware.

The distributed storage systems described below have at least two advantages. 1) the systems leverage a node level durability/availability scheme (replication or erasure-coding, for example) to recover from drive-level failures. 2) The innovation achieves a desired durability level by using highly parallel distributed local copying to make additional copies of the data on a disk that just failed, or is about to fail, fast enough that the probability that a second disk (system-wide) will fail before those copies have been completed is low enough to be acceptable at the desired durability level. This avoids making a lot more copies ahead of time, improving storage efficiency. For instance, a +2 error correction policy may be used instead of a +3 error correction policy to store data while still achieving 11 9s durability of the stored data.

Figure 1:
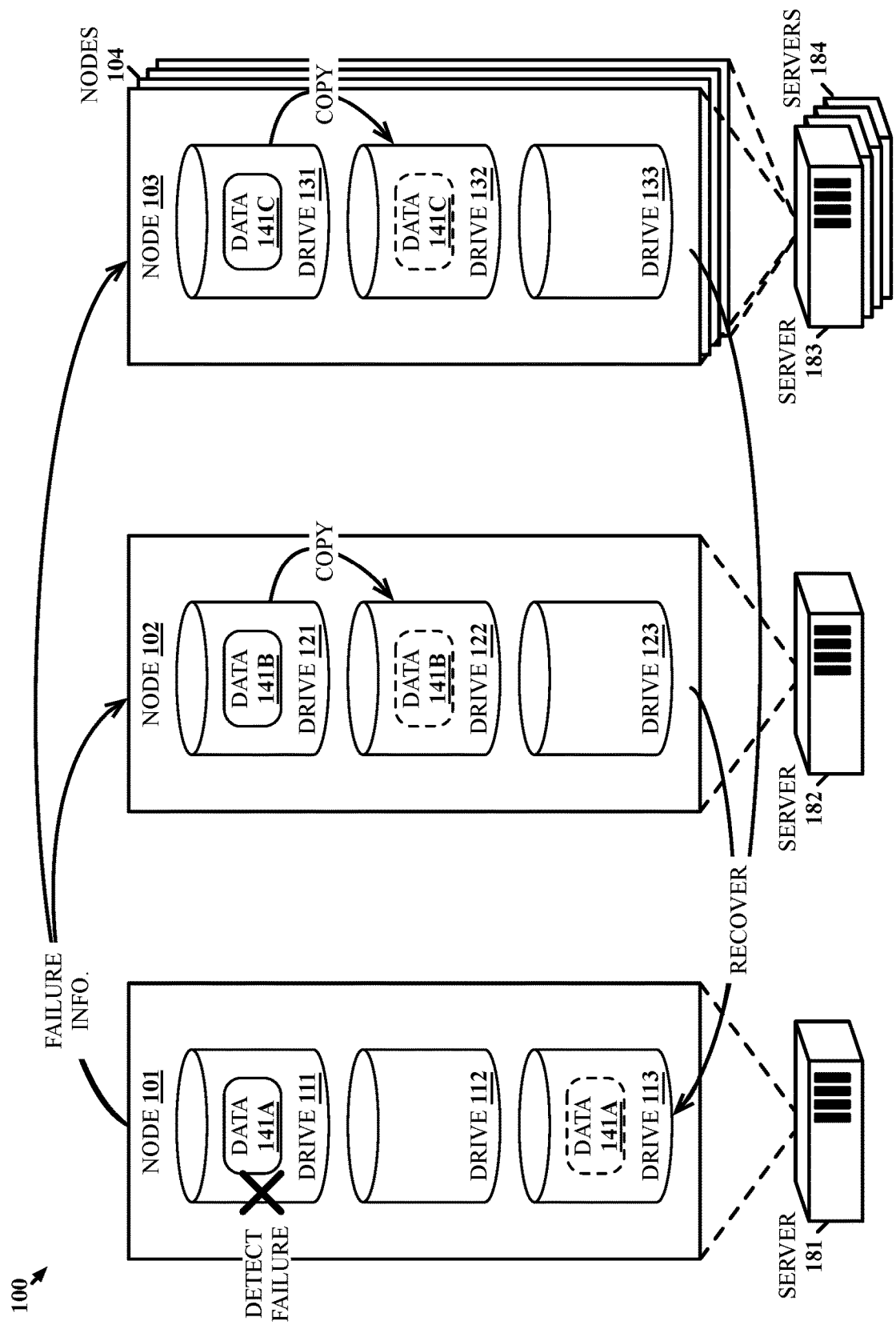
FIG. 1 illustrates an implementation for protecting data stored across nodes in a distributed storage system when a node fails.

FIG. 1 illustrates implementation 100 for protecting data stored across nodes in a distributed storage system when a node fails. Implementation 100 includes nodes 101-104 implemented by servers 181-184. Other types of computing systems may also be used, including multiple computing systems for each node. Nodes 101-104 may be positioned at different geographic locations. While not shown, one or more communication links, networks, and devices may exist to exchange communications between servers 181-184 on behalf of nodes 101-104. Node 101 includes drives 111-113, node 102 includes drives 121-123, and node 103 includes drives 131-133. Nodes 104 also include drives, although, not shown. The drives may be HDDs, SSDs, or some other type of storage device. While nodes 101-103 each include three drives in this example, nodes 101-103 may include any number of two or more drives. The drives may be installed within respective servers 181-184 or may be included in one or more external storage systems collocated therewith. The number of nodes in nodes 101-104 is at least enough nodes to store respective components of a protected data set at a different node. For example, a 4-disk RAID4 or RAID5 configuration would include four nodes (i.e., one node for each of the four disks).

In operation, nodes 101-104 are part of a distributed storage system. In this example, data is striped across three of nodes 101-103. Node 101 stores data 141A on drive 111, node 102 stores data 141B on drive 121, and node 103 stores data 141C on drive 131. Data 141A, data 141B, and data 141C are components of data set 141 after data set 141 is protected. For instance, when data set 141 is stored, the distributed storage system may use an erasure coding scheme or a 3-disk RAID4 scheme that results in the three components shown in implementation 100. The components may instead be full copies of data set 141. The distributed storage system selects a different node of nodes 101-104 to store each of the three components and, in this case, nodes 101-103 were selected. The nodes may be selected at random, or the distributed storage system may use information about nodes 101-104 to select nodes. For example, the distributed storage system may consider available capacity at the nodes, processing resources available at the nodes, geographic location of the nodes, or other characteristics of the nodes. In some cases, the information may be used to identify a subset of nodes 101-104 to which the data components can be stored and then the distributed storage system may select nodes 101-103 at random from the subset.

Once data set 141 is stored across nodes 101-103, a data component stored at any one node can be recovered based on the components at the remaining nodes. For example, if data 141A is lost due to drive 111 or node 102 as a whole failing, data 141A can be recovered using data 141B and data 141C in accordance with whatever data protection scheme was used. Since the data components are stored at different nodes, data set 141 is further protected in the event something happens at a single node to cause failure of more than one drive or otherwise render the node inaccessible, which may prevent data recovery if more than one component was stored at that node. While this example only allows for one component to be lost before data set 141 cannot be recovered, in some examples, the data protection scheme used on data set 141 may enable more than one drive to fail while still enabling recovery.

In this example, when drive 111 fails, data set 141 is at increased risk being lost should drive 121 or drive 131 fail before data 141A can be recovered. Typically, this is what drives a distributed storage system provider to use data protection schemes that allow for more components to be lost before a data set is not recoverable. Since those schemes will also require more storage devices, the storage efficiency is reduced for the distributed storage system. To allow for greater storage efficiency without using more storage devices, the distributed storage system herein creates a local copy of each remaining data component when a drive fails. In implementation 100, node 102 creates a copy of data 141B on drive 122 and node 103 creates a copy of data 141C on drive 132. Thus, even in the unlikely case that drive 121 or drive 131 also fails before data 141A, a backup exists of data 141B and data 141C from which data 141A can be recovered. A data protection scheme with a lower storage efficiency is not needed to account for the possibility that drive 121 and drive 131 may also fail. In this example, node 101 uses data 141B and data 141C to recover data 141A to a different drive, drive 113, at node 101. Drive 113 may be a replacement drive of drive 111 (e.g., a technician may physically replace drive 111 with drive 113) or may be another drive at node 101.

While only data set 141 is shown in implementation 100, it should be understood many different data sets may be stored in the distributed storage system. For instance, drive 111 may include components of other data sets that, like data set 141, have other components distributed across nodes 101-104. Thus, when drive 111 fails, the other components that were stored on drive 111 may also be recovered to drive 113 (or the different components may be distributed differently among the drives of node 101 upon recovery).

Figure 2:
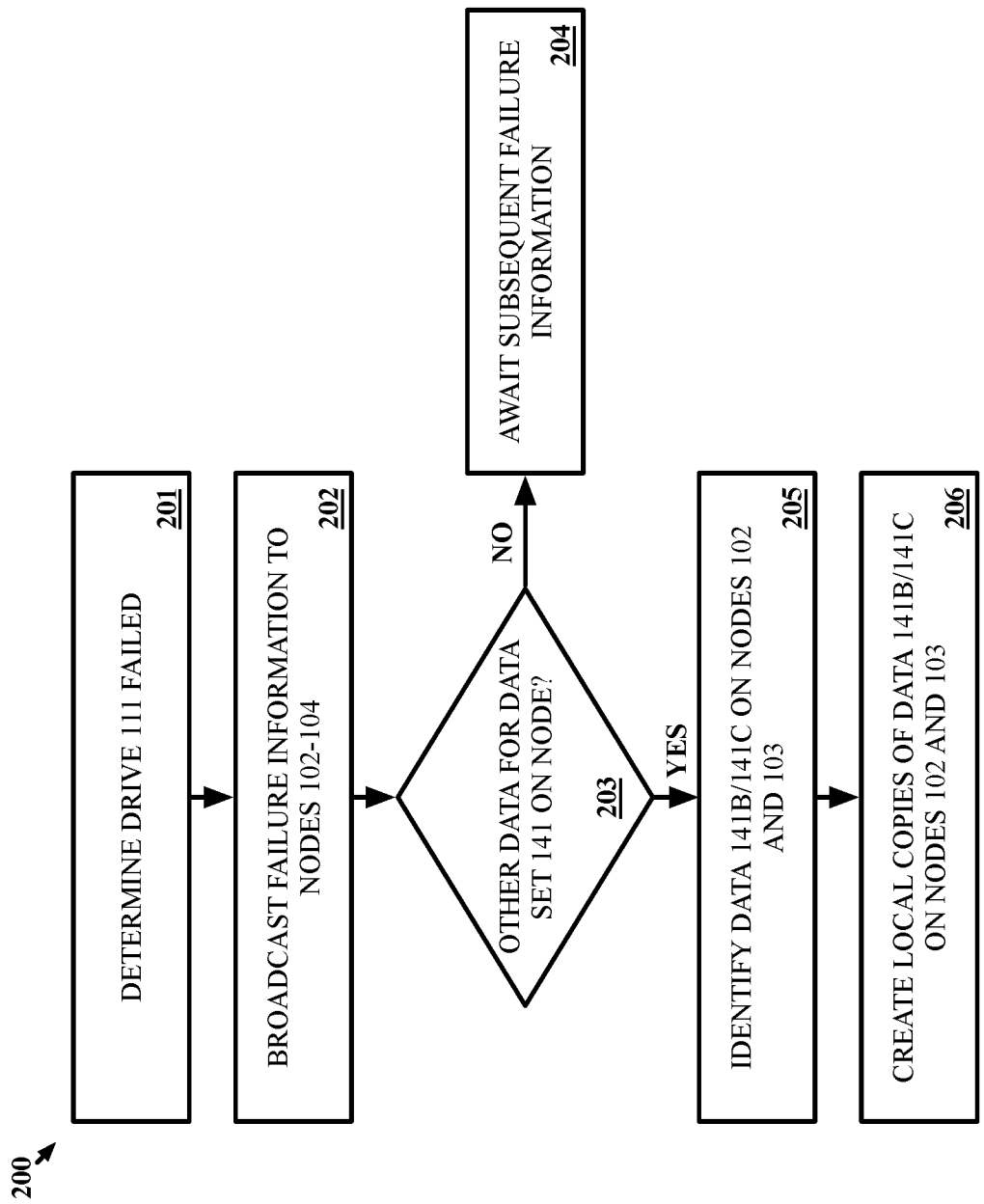
FIG. 2 illustrates an operation to protect data stored across nodes in a distributed storage system when a node fails.

FIG. 2 illustrates operation 200 to protect data stored across nodes in a distributed storage system when a node fails. In operation 200, node 101 determines drive 111 has failed (step 201). Node 101 may monitor drives 111-113 to ensure the drives are operating properly. For example, node 101 may monitor for data errors when performing IO, drive temperature, drive vibrations, drive motors, or some other characteristic-including combinations thereof. In some examples, node 101 may identify drive 111 as having failed prior to full failure by determining that failure is imminent. Drive 111 stores at least data 141A of data set 141. Data set 141 may be a storage volume, a file, or any other type of data unit that can be protected and striped across multiple drives. Drive 111 may also include components of other data sets.

In response to determining drive 111 has failed, node 101 broadcasts failure information other nodes of nodes 101-104 (step 202). The failure information at least includes an identifier for data set 141 that would be recognized by any other node storing components of data set 141. For example, if data set 141 is a storage volume, then the identifier may be a name of the storage volume. The failure information may also include an identifier for node 101 so that receiving nodes are informed about which node experienced the drive failure. The failure information is broadcasted in the sense that a message including the failure information is transmitted to each of the other nodes. The broadcast may use a multicast of a message including the failure information to the other nodes or may send individual messages with the failure information to the other nodes. The message may be transmitted using any protocol or message formatting. The failure information may be sent to all other nodes because node 101 may not know which other nodes store the other components of data set 141. In some examples, node 101 may be aware of which nodes store components of data sets stored on drive 111 and may only send the failure information to those nodes.

In response to receiving the failure information, the other nodes determine whether data of data set 141 is stored thereon (step 203). In this example, node 102 and node 103 are the subset of the other nodes that include components of data set 141. Nodes 104 are not included in the subset because they do not include a component of data set 141. Upon receiving the failure information, each node uses the identifier for data set 141 to determine whether data associated with the same identifier is stored thereon. The distributed storage system may maintain metadata that can be referenced by nodes 101-104 to determine whether any component of data set 141 is stored thereon. The metadata may be maintained at the nodes or in a controller for the distributed storage system. In another example, drives 121-123 may each include an index listing names of storage volumes stored thereon or node 102 may maintain an index covering all drives. If the name identified in the failure information matches a name in the index(es), then a node recognizes that it also includes data of the identified storage volume. In this example, node 102 and node 103 may find an identifier of data set 141 in their respective indexes. Nodes 104 do not find the identifier in their indexes. Therefore, nodes 104 do not need to perform any action in response to the failure information and await receiving subsequent failure information from nodes 101-104, which may identify a data set that is stored thereon (step 204). In this example, the failure information only identifies data set 141 but, in other examples, drive 111 may store more data sets and the failure information may identify those data sets as well. A single message may identify all data sets affected by the failure of drive 111 or the data sets may be identified over multiple messages.

In node 102 and node 103 being nodes in a subset of the other nodes having data set 141, data of data set 141 is identified. Specifically, node 102 identifies data 141B on drive 121 and node 103 identifies data 141C on drive 131 (step 205). After identifying data 141B and data 141C, node 102 and node 103 create local copies of data 141B and data 141C (step 206). Node 102 copies data 141B to drive 122 and node 103 copies data 141C to drive 132. Copying data between drives local to a node occurs much faster than copying data over a network, especially over the Internet. Preferably, the copy action remains predominately in kernel space of the node's operation system, which should provide increased copy performance (e.g., speed) over typical read/write actions. For example, nodes running Linux® may use an io_uring to copy the data. An io_uring is a Linux kernel system call interface designed to improve the performance of asynchronous I/O operations and works by creating two ring buffers in shared memory that are used as queues between user space and the kernel. The faster data can be copied to another local drive the less time the data remains unprotected from another drive failure (e.g., protection from drive 121 or drive 131 also failing). Drive 122 and drive 132 may be selected by their respective nodes to receive the copies based on storage capacity, not being occupied by other tasks at the time, at random, or based on some other factor-including combinations thereof.

Once the copies are complete, node 102 includes two copies of data 141B and node 103 includes two copies of data 141C. Should drive 121 fail before data 141A can be recovered, the copy of data 141B on drive 122 can be used to recover data 141A instead. Likewise, should drive 131 fail before data 141A can be recovered, the copy of data 141C on drive 132 can be used to recover data 141A instead. Thus, data set 141 is protected from further drive failure without the distributed storage system having to use a less storage efficient data protection scheme to account for further drive failures. Once data 141A has been recovered to a drive on node 101 (e.g., drive 113), the copies of data 141B and data 141C may be removed from node 102 and node 103 to free up storage space on drive 122 and drive 132 for other purposes.

Figure 3:
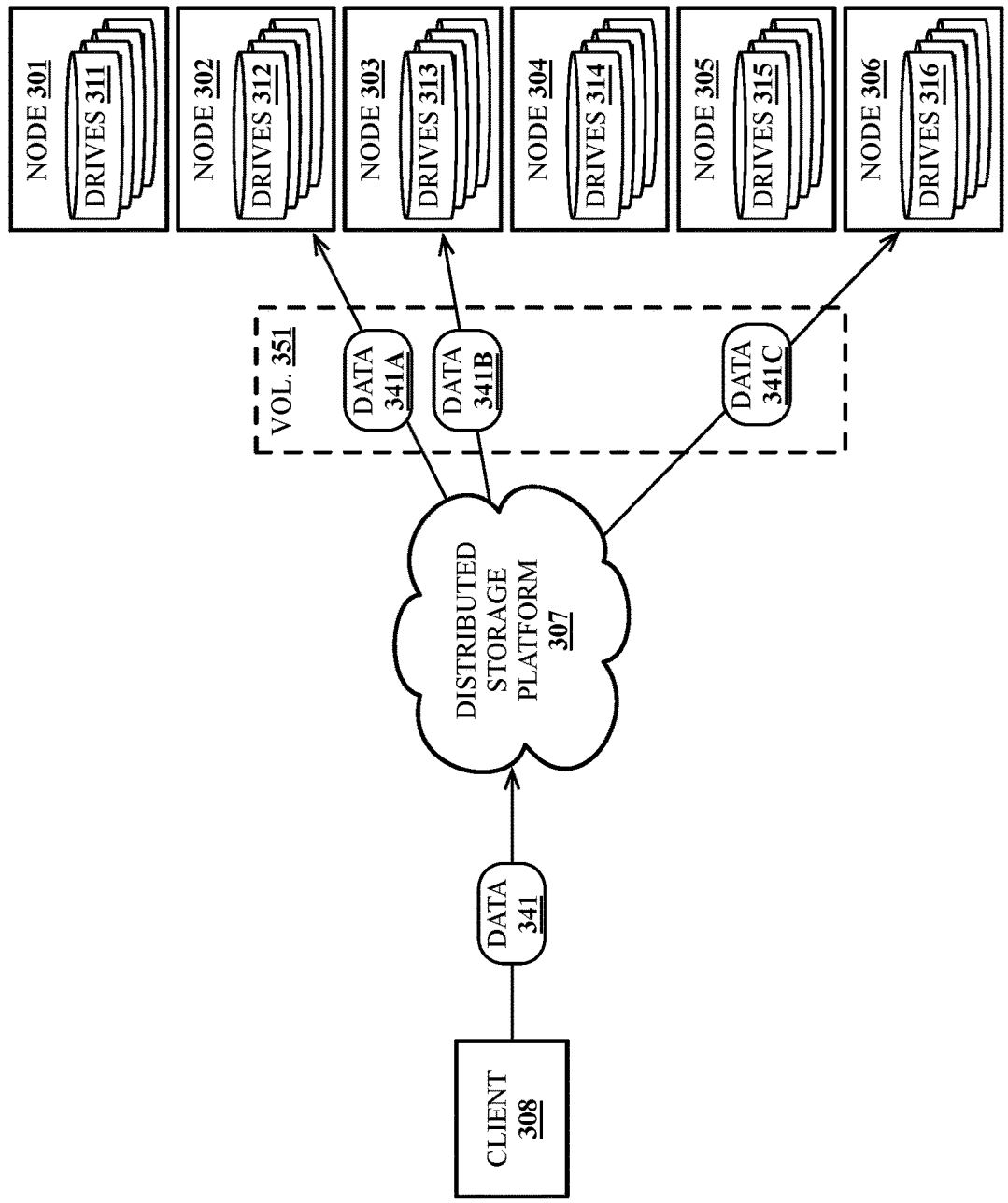
FIG. 3 illustrates an implementation for protecting data stored across nodes in a distributed storage system when a node fails.

FIG. 3 illustrates implementation 300 for protecting data stored across nodes in a distributed storage system when a node fails. Implementation 300 includes nodes 301-306, distributed storage platform 307, and client 308. Distributed storage platform 307 includes any software that provides a distributed storage system including nodes 301-306. In some examples, the software may execute solely on nodes 301-306 while, in other examples, one or more additional systems may exist aside from nodes 301-306 to provide the distributed storage system. Distributed storage platform 307 executes on nodes 301-306 to provide at least the data storage and recovery features discussed herein. In addition to processing circuitry to execute software for distributed storage platform 307, nodes 301-306 also include drives 311-316 for storing data for the distributed storage system.

Client 308 is a computing system for accessing the distributed storage system via distributed storage platform 307. In some examples, software executing on client 308 to communicate with distributed storage platform 307 may be considered part of distributed storage platform 307. In this example, client 308 is storing data 341 on the distributed storage system by contacting distributed storage platform 307. Since distributed storage platform 307 may be executing on nodes 301-306, client 308 may connect to one of nodes 301-306 to communicate with distributed storage platform 307. Data 341 may transmit data 341 with an instruction to write data 341 to storage volume 351. In this example, distributed storage platform 307 handles the data protection of data 341 across a subset of data 341. The data protection may be performed by the node contacted by client 308 to store data 341, a data protection server of distributed storage platform 307, software on client 308 that is part of distributed storage platform 307, or some other component of distributed storage platform 307. In this example, storage volume 351 is stored across node 302, node 303, and node 306. Data 341 is likewise processed into three components, data 341A, data 341B, and data 341C (e.g., two data and one parity component). If storage volume 351 is already provisioned on node 302, node 303, and node 306, then data 341 is stored on respective ones of drives 312, drives 313, and drives 316 already storing storage volume 351. However, if storage volume 351 has not already been provisioned, distributed storage platform 307 may select node 302, node 303, and node 306 to store storage volume 351. Node 302, node 303, and node 306 may be selected at random, based on characteristics of the nodes, or based on some other factor. The number of nodes selected depends on the data protection scheme being used. In this example, the data protection scheme produces three components, but other schemes may produce more or fewer components when protecting data.

Figure 4:
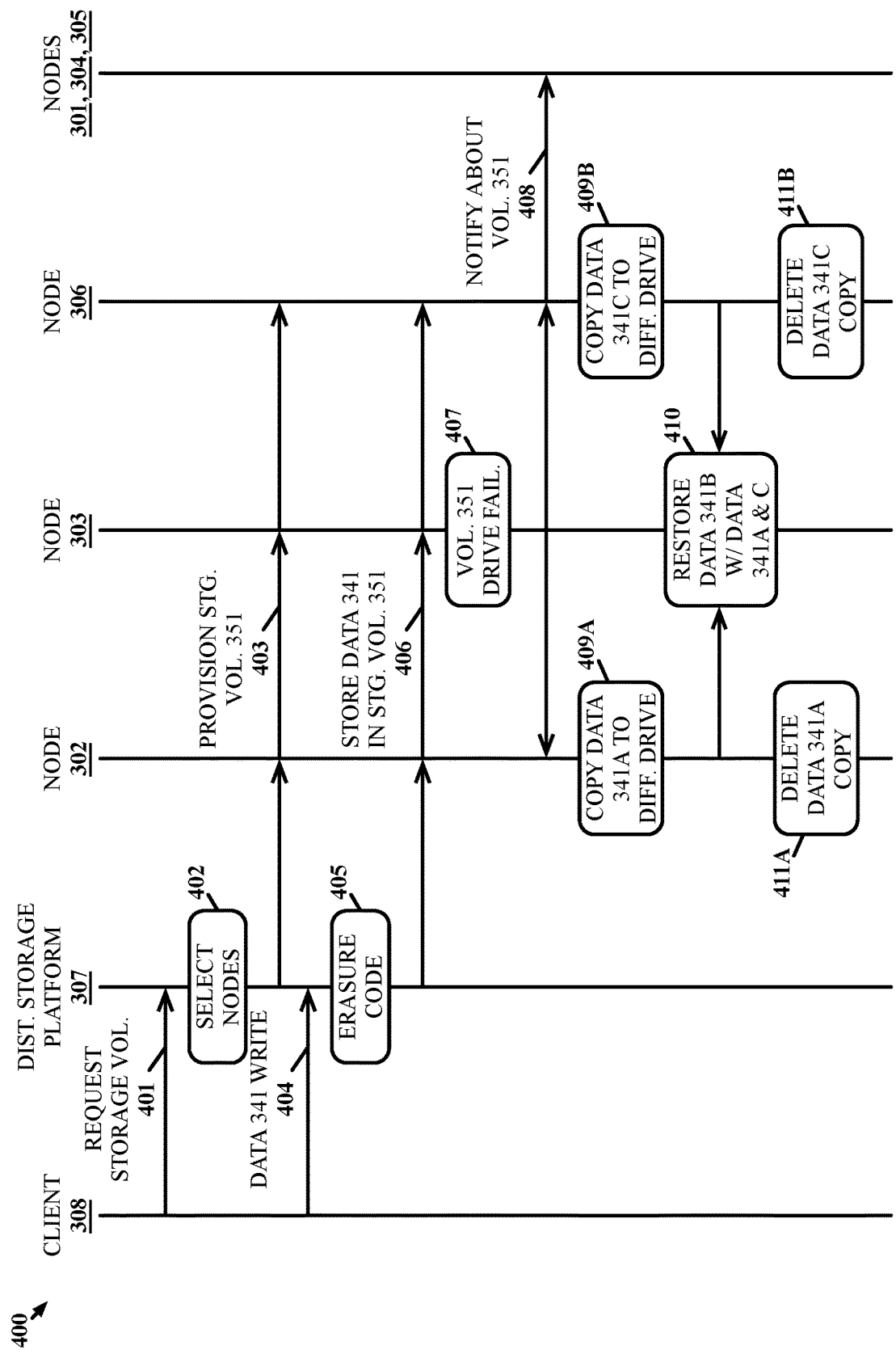
FIG. 4 illustrates an operational scenario for protecting data stored across nodes in a distributed storage system when a node fails.

FIG. 4 illustrates operational scenario 400 for protecting data stored across nodes in a distributed storage system when a node fails. Operational scenario 400 is an example beginning before client 308 requests provisioning of storage volume 351 in the distributed storage system. At step 401, client 308 requests provisioning of storage volume 351. The request may be made using any protocol or convention understood by distributed storage platform 307. In some examples, client 308 may provide data to be written to storage volume 351 at the time storage volume 351 is requested or after provisioning of storage volume 351. The request may indicate a volume size (i.e., the desired size for storage volume 351), a desired service level (e.g., a performance tier or capacity tier), data protection requirements (i.e., the desired data protection level for storage volume 351, such as replication or erasure coding), access control parameters (e.g., user permissions, group memberships, etc.), or any other requirements desired for storage volume 351.

Upon receiving the request from client 308, distributed storage platform 307 selects node 302, node 303, and node 306 at step 402 from nodes 301-306 on which storage volume 351 will be provisioned. The number of nodes selected is based on the desired data protection indicated by the request. In this example, storage volume 351 is erasure coded across three drives (at three different nodes), although, had the request asked for a replica of storage volume 351 be created for data protection, distributed storage platform 307 may have selected only two nodes, one for the primary copy of storage volume 351 and one for a backup copy of storage volume 351. Distributed storage platform 307 communicates with node 302, node 303, and node 306 at step 403 to provision storage volume 351 onto those nodes. Distributed storage platform 307 may designate a particular drive on each of the nodes or may allow the nodes to select a drive on their own. After provisioning storage volume 351, distributed storage platform 307 may notify client 308 that storage volume 351 is provisioned so that client 308 can mount storage volume 351 for an application executing on client 308.

Client 308 transmits data 341 to distributed storage platform 307 at step 404 with an instruction to write data 341 to storage volume 351. Data 341 may be transmitted at the request of an application on client 308 that has mounted storage volume 351. Upon receiving data 341, distributed storage platform 307 erasure codes data 341 at step 405 to protect data 341 in the event a drive storing components of data 341 fails. In this example, the erasure coding results in three components for storage in a drive to which storage volume 351 is provisioned at each of node 302, node 303, and node 306. Distributed storage platform 307 transmits data 341A to node 302, data 341B to node 303, and data 341C to node 306 for storage at step 406. If one of the three nodes is the node to which client 308 is connected to access distributed storage platform 307, the data component for storage on that node need not be transmitted. While only one write of data 341 is described in this scenario, it should be understood additional data may be written to storage volume 351 in other examples. That additional data can be considered part of data 341 for the purposes of recovering from a drive failure, as described below.

After a time, a drive of drives 313 at node 303 storing data 341B for storage volume 351 fails and node 303 detects the failure at step 407. In some examples, node 303 may determine the drive as failed even if the drive has not yet completely failed but node 303 has determined such failure is imminent. In response to detecting the failure, node 303 broadcasts a notification message at step 408 notifying other nodes of nodes 301-306 that storage volume 351 has experienced a drive failure. The notification message may include a name for storage volume 351 that is also used by other nodes to which storage volume 351 is provisioned. The notification message may also identify other storage volumes that were stored on the failed drive so that the data of the other storage volumes can be similarly protected as data 341 of storage volume 351 will be.

Upon the other nodes of nodes 301-306 receiving the notification message, only node 302 and node 306 recognize the name of storage volume 351 (e.g., within a data structure or other repository of storage volume names stored thereat). Storage volume 351 was not provisioned to node 301, node 304, or node 305. Thus, the name of storage volume 351 would not be recognized by those nodes. At step 409, both node 302 (step 409A) and node 303 (step 409B) identify and copy portions of storage volume 351 stored thereat. Node 302 determines data 341A is stored on one of drives 312 and copies data 341A to another of drives 312 so that two copies of data 341A are stored on different drives local to node 302. Node 306 determines data 341C is stored on one of drives 314 and copies data 341C to another of drives 314 so that two copies of data 341C are stored on different drives local to node 306. Copying data between two local drives can occur very quickly relative to transmitting the data over a network (e.g., to another node) for copying. As such, storage volume 351 is protected from additional drive failures occurring at node 302 and node 306 before data 341B can be recovered to node 303.

After the drive failure, node 303 begins recovery of data 341B at step 410. Even if the recovery begins at substantially the same time as node 302 and node 306 are copying data 341A and data 341C to other local drives, the amount of time it will take to receive data 341A and data 341C over the network to rebuild data 341B therefrom will likely take much more time than the local copies. Thus, it is still beneficial to create the copies at node 302 and node 306. Data 341B may be recovered to a drive already existing in node 303 when the original drive for data 341B failed or recovery may not begin until a new drive is installed by a user (e.g., as a physical replacement for the failed drive).

After the recovery of data 341B completes, node 303 may notify node 302 and node 303 of the completion. The copies of data 341A and data 341B are no longer necessary to protect against drive failure. As such, node 302 deletes the copy of data 341A at step 411A and node 303 deletes the copy of data 341C at step 411B. The space previously used by the copies can then be used to store other data. In some examples, a node may decide to keep the newer copy and delete the original if node determines it would be beneficial to do so, as long as one copy remains.

Figure 5:
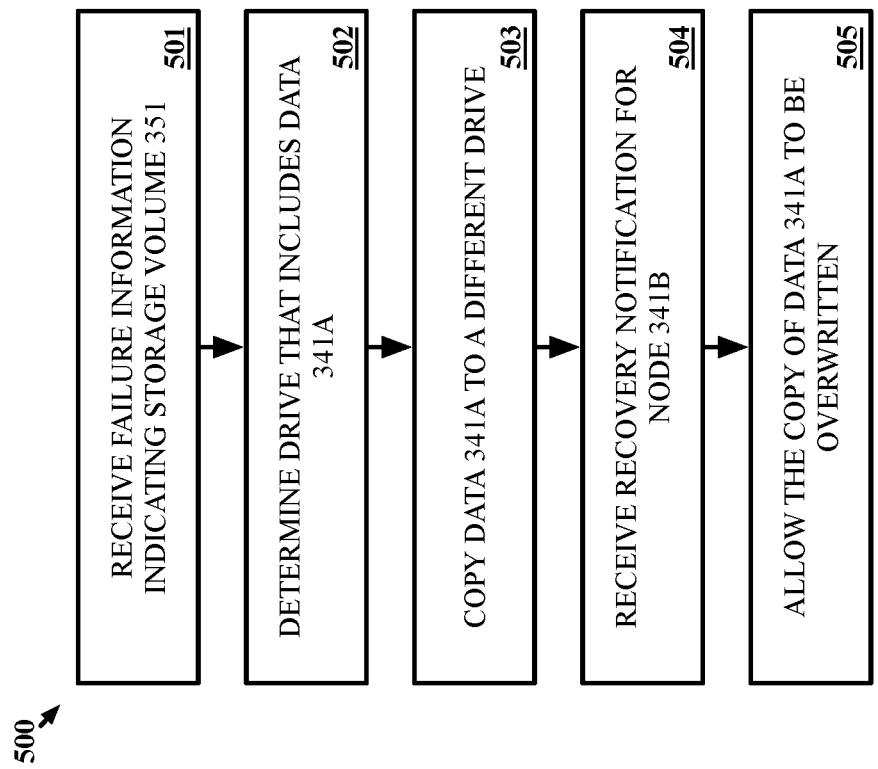
FIG. 5 illustrates an operation to protect data stored across nodes in a distributed storage system when a node fails.

FIG. 5 illustrates operation 500 to protect data stored across nodes in a distributed storage system when a node fails. Operation 500 is an example of steps taken by a node when a drive fails in a remote node. In this example, operation 500 is performed by node 302 but may be performed by node 102, node 103, or node 306 in the examples described above. In operation 500, node 302 receives failure information from node 303 (step 501). The failure information includes an identifier of storage volume 351 for which data was stored on the failed drive. The failure information may explicitly instruct node 302, or any other node having data for storage volume 351, to begin protecting their local data, node 302 may recognize from the type of message received with the failure information that local storage volume 351 data should be protected, or the message may trigger node 302 to protect data 341A in some other manner.

Node 302 determines which drive of drives 312 includes data for storage volume 351 (step 502). In this example, node 302 identifies data 341A on a drive of drives 312. The drive may include an index indicating which volumes have data stored thereon and where on the drive the data is located so that node 302 can use that indexed information to find data 341A. Once identified, node 302 copies data 341A to another of drives 312 (step 503). Node 302 may include a drive of drives 312 designated to receive local copies of data for protection against drive failure, node 302 may select a drive of drives 312 that has enough available capacity to accept a copy of data 341A, or node 302 may use some other logic for determining which drive of drives 312 should store the copy. If running Linus, node 302 may use an io_uring system call to perform an asynchronous data transfer of a copy of data 341A between drives while avoiding user space, which speeds up data transfer. Speed is desirable because, until the copy of data 341A is complete, storage volume 351 is susceptible to data loss due to another drive failing. Other operating systems may include system calls similar to io_uring that avoid entering user space and the speed compromises associated therewith.

After data 341A is copied, node 302 keeps the copy at least until data 341B has been recovered at node 303. Node 302 receives a recovery notification transmitted by node 303 indicating that the recovery of data 341B is complete (step 504). Although not shown, node 302 may provide data 341A to node 303 so that node 303 can restore data 341B from data 341A and data 341C based on the erasure coding scheme used to create the components of data 341. Regardless, in this example, node 302 allows the copy of data 341A to be overwritten in response to data 341B being recovered (step 505). Node 302 may simply allow the copy to be overwritten instead of deleting the copy to further speed up a future copy that may be needed. For example, if node 302 needs to copy data 341A again (e.g., due to another drive failure at node 303 or node 306), node 302 may be able to simply prevent the copy of data 341A if data 341A has yet to be overwritten. Had the copy been deleted then that option would not exist.

Figure 6:
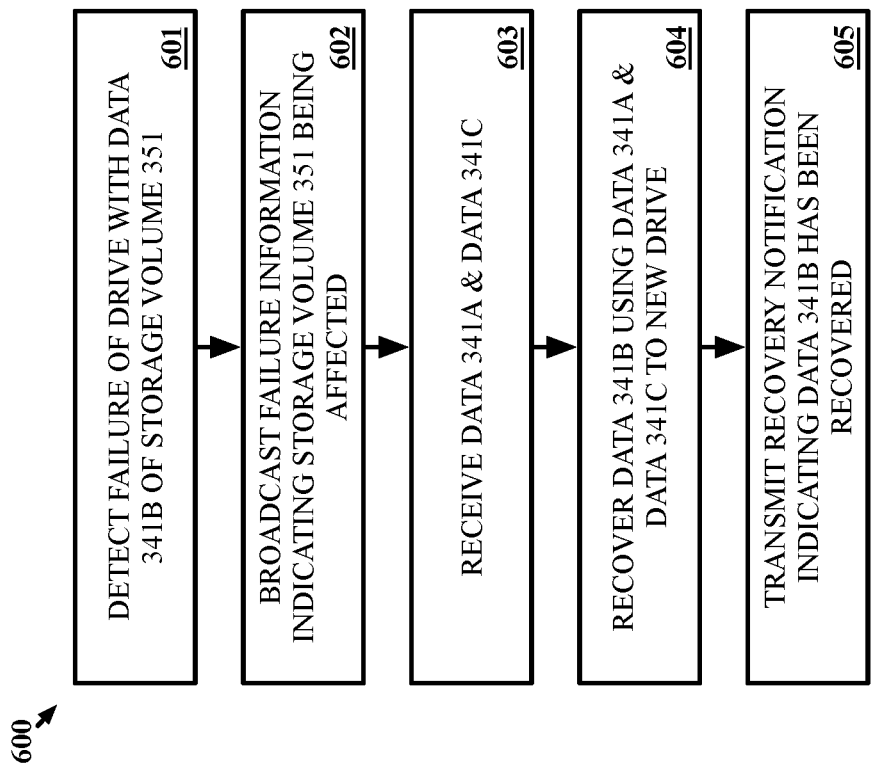
FIG. 6 illustrates an operation to protect data stored across nodes in a distributed storage system when a node fails.

FIG. 6 illustrates operation 600 to protect data stored across nodes in a distributed storage system when a node fails. Operation 600 is an example of steps taken by a node when a drive fails in the node. In this example, operation 600 is performed by node 303 but may be performed by node 101 in the examples described above. Node 303 detects a failure of a drive of drives 313 storing data 341B (step 601). Node 303 may monitor drives 313 for health of their physical components or the data being written to or read from the drive. For example, node 303 may be able to recognize when a drive is overheating, exhibiting improper motor movements, above a threshold amount of data errors, not responding at all, or any other indicator of a drive's health. Node 303 may reference data stored on another of drives 313 to determine which storage volumes are stored on the failed drive. If the drive can still be accessed (e.g., has yet to completely fail), node 303 may be able to reference information on the failed drive to determine which storage volumes are stored thereon. In this example, node 303 determines that storage volume 351 is stored on the failed drive. In other examples, additional storage volumes may also include data stored on the failed drive.

In response to detecting the failed drive, node 303 broadcasts failure information to other nodes of nodes 301-306 (step 602). The failure information includes an identifier, such as a name, of storage volume 351. The identifier of storage volume 351 is consistent across all nodes storing data components of storage volume 351 such that, when the other nodes receive the failure information, they can determine whether the indicated identifier matches an identifier of data stored at the node. In this example, node 302 and node 306 receive the failure information and recognize that they also store data for storage volume 351. Specifically, node 302 stores data 341A and node 306 stores data 341C and both nodes create copies in accordance with operation 500 above. The other nodes of nodes 301-306 do not store data of storage volume 351 and do not create copies.

After detecting the drive failure, node 303 can begin the process to recover the data on the failed drive. Specifically, the erasure coding scheme used to create the three components of storage volume 351 enables any one component to be recreated from the other two. Thus, node 303 receives data 341A from node 302 and data 341C from node 306 (step 603). Node 303 recovers data 341B from data 341A and data 341C to a drive of drives 313 that has not failed (step 604). In some examples, node 303 may select another drive of drives 313 that has capacity for data 341B or node 303 may wait until a new drive physically replaces the failed drive to restore data 341B to that new drive. After recovering data 341B, node 303 transmits a recovery notification to at least node 302 and node 306 informing them that data 341B has been recovered (step 605). Informing node 302 and node 306 of the recovery allows node 302 and node 306 to use the storage space currently storing copies of data 341A and data 341C for other purposes.

Figure 7:
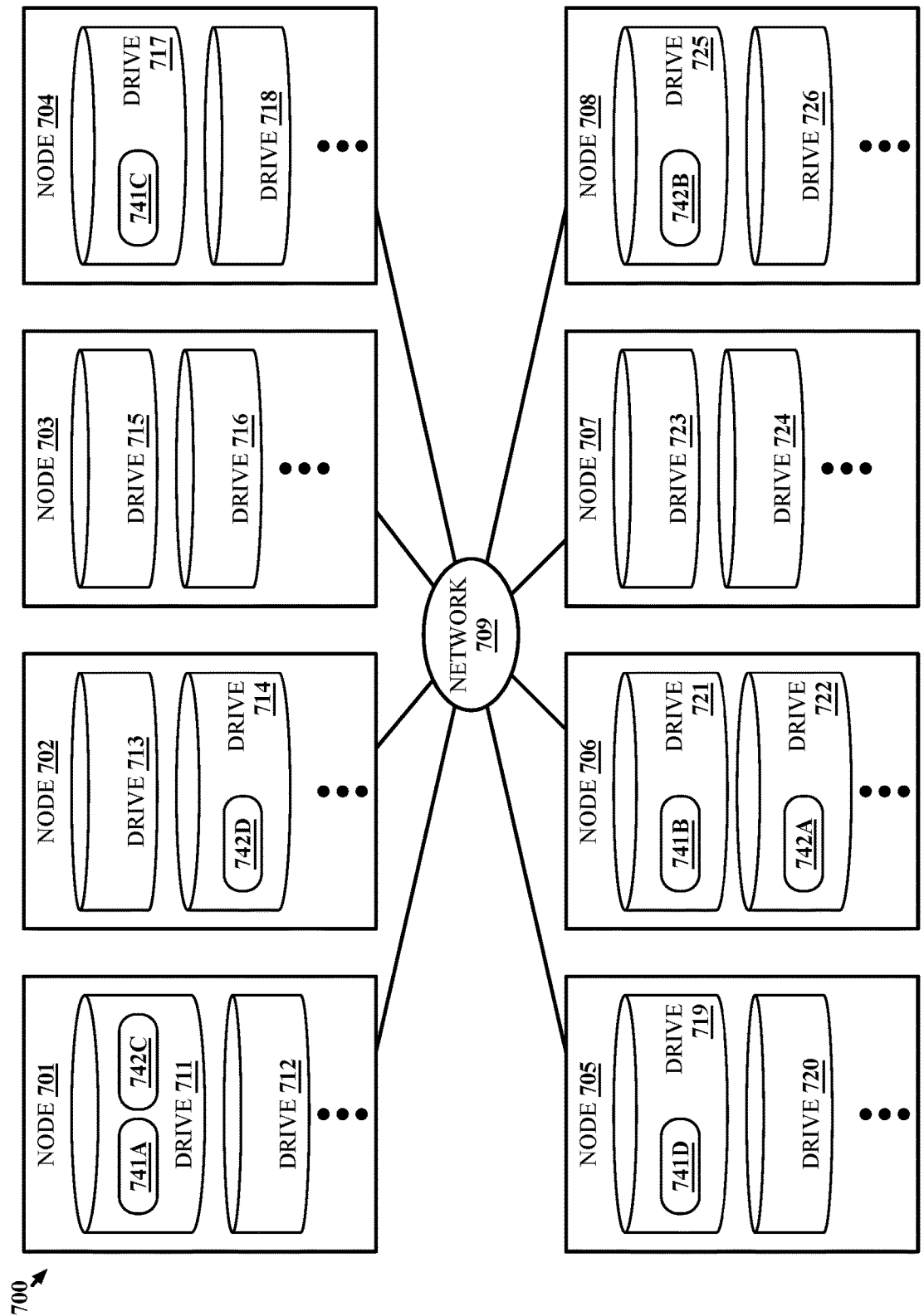
FIG. 7 illustrates an implementation for protecting data stored across nodes in a distributed storage system when a node fails.

FIG. 7 illustrates implementation 700 for protecting data stored across nodes in a distributed storage system when a node fails. Implementation 700 includes nodes 701-708, which communicate over network 709 and form a distributed storage system. Although not shown, network 709 may also connect to one or more client systems that executing applications that access data on nodes 701-708. Nodes 701-708 include respective drives 711-726 and may include more drives than shown for the purposes of this example. Implementation 700 is an example where data for more than one data set (e.g., storage volume) is stored on a drive that fails. While implementation 700 includes two data sets, data set 741 and data set 742, any number of data sets may have data included on a single drive.

In this example, the distributed storage system randomly distributed erasure coded components of data set 741 on drive 711 of node 701, drive 721 of node 706, drive 717 of node 704, and drive 719 of node 705. The distributed storage system randomly distributed erasure coded components of data set 742 on drive 722 of node 706, drive 725 of node 708, drive 711 of node 701, and drive 714 of node 702. The benefits of this random distribution across nodes 701-708 will be apparent in operational scenario 800 below. From a data protection standpoint, each component being stored on a different node reduces the risk of a data set not being recoverable should a node fail. Randomly selecting the subset of nodes to which data components are distributed decreases the likelihood that any two nodes will store data components from the same data set. For instance, in this case, only node 701 and node 706 store data components from both data set 741 and data set 742.

Figure 8:
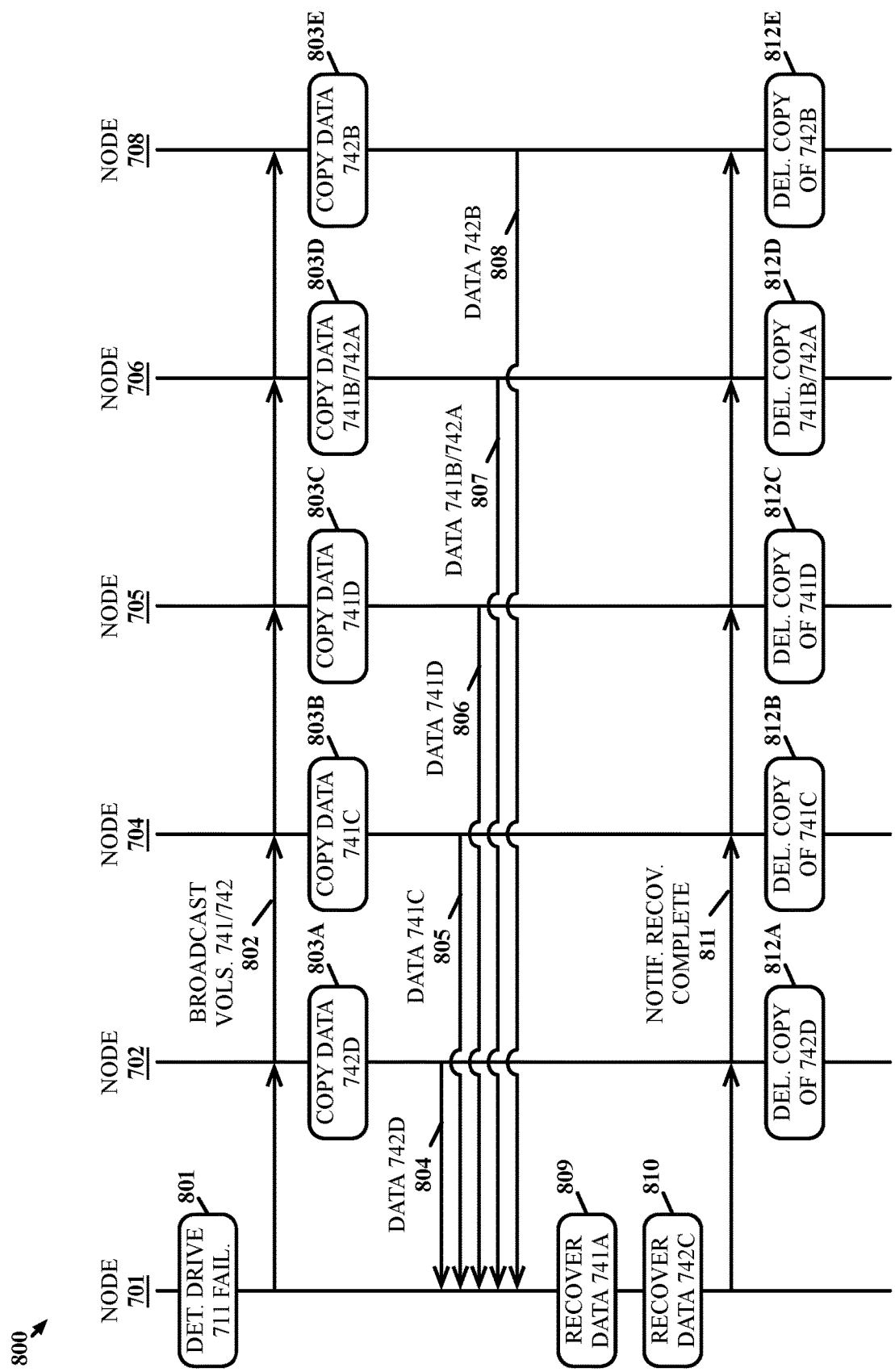
FIG. 8 illustrates an operational scenario for protecting data stored across nodes in a distributed storage system when a node fails.

FIG. 8 illustrates operational scenario 800 for protecting data stored across nodes in a distributed storage system when a node fails. In operational scenario 800, node 701 detects failure of drive 711 at step 801. In response to detecting the failure, node 701 determines data set 741 and data set 742 are affected by the failure (i.e., are data sets having components stored on drive 711) and broadcasts identifiers of data set 741 and data set 742 at step 802 to other nodes of nodes 701-708. Node 703 and node 707 also receive the broadcast but are not included in operational scenario 800 since neither includes a component of data set 741 or data set 742 and, therefore, will not act in response to the broadcast. In other examples, drive 711 may store components of other data sets distributed across nodes 701-708.

Node 702, node 704, node 705, node 706, and node 708 all receive the identifiers and recognize that they store components of one or both of data set 741 and data set 742. In response to receiving the identifiers, node 702, node 704, node 705, node 706, and node 708 all copy their respective components of data set 741 and/or data set 742 at step 803 to another local drive. Specifically, node 702 copies data 742D to drive 713 at step 803A, node 704 copies data 741C to drive 718 at step 803B, node 705 copies data 741D to drive 720 at step 803C, node 706 copies data 741B to drive 722 and data 742A to drive 721 at step 803D, and node 708 copies data 742B to drive 726 at step 803E. In other examples, node 706 may copy data 741B and data 742A to other drives thereat rather than to share drives with another components of data set 741 or data set 742.

After creating the copies, the components of data set 741 and data set 742 to other local drives at each node, data set 741 and data set 742 are now protected from further drive failure. Data set 741 and data set 742 may be even further protected if the original erasure coding used for the sets enables more than one drive failure before the data is lost. For instance, if the erasure coding allows for a data set to be recovered with two components being lost (e.g., the drives for each component failing or a +2 error correction policy), then the data set will still be recoverable even in the exceedingly rare situation where both the original data component and the copy of the data component also fail at another node. Advantageously, this allows a distributed storage system provider to guarantee durability on par with higher levels of erasure coding. Higher levels of erasure coding (e.g., a +3 error correction policy) will consume more space on the distributed storage system to allow for more components to be lost before a data set cannot be recovered. By creating copies at nodes that have yet to fail lower levels of erasure coding can be used to increase the storage efficiency of the distributed storage system without compromising on the durability of the data set being stored. For example, data protection provided herein may enable a +2 erasure coding scheme that allows up to two components to be lost before a data set is unrecoverable to have a substantially similar durability rating to a +3 erasure coding scheme that allows up to three data components to be lost all while the +2 erasure coding scheme will have a better storage efficiency than the +3 scheme.

In this example, node 702, node 704, node 705, node 706, and node 708 assist node 701 with the recovery of data 741A and data 742C, which were stored on failed drive 711. Specifically, the nodes send their respective data components to node 701 at steps 804-808. Since the data components are randomly distributed across nodes, it will be very rare for one node to be responsible for sending a substantial portion of the data components. Even in this example, only one node, node 706, sends more than one component. Resources required to recover a data set should, therefore, not over burden any one node. Similarly, when copying the data components in step 803 above, it is unlikely that any one node will have a significant amount of data to copy, which helps ensure the copies are made quickly before any other drive is able to fail.

Using data 741B, data 741C, and data 741D, node 701 recovers data 741A to drive 712 or a replacement of drive 711 at step 809. Node 701 also recovers data 742C to drive 712 or a replacement of drive 711 at step 810 using data 742A, data 742B, and data 742D. Upon completing the recovery of data 741A and data 742C, node 701 sends a recovery notification at step 811 to node 702, node 704, node 705, node 706, and node 708 notifying them that the recovery is complete, and the nodes no longer need to maintain two copies of the components stored thereon. Responsive to the notification, node 702, node 704, node 705, node 706, and node 708 delete their respective component copies at steps 812A-E. Thus, even if the storage efficiency for data set 741 and data set 742 decreases during the time the copies exist, the storage efficiency increases back to normal once the copies are no longer needed.

Prior to recovery of data 741A and data 742C, the distributed storage system may still be able to respond to data requests to data set 741 and data set 742. The requested data may be restored on the fly from node 702, node 704, node 705, node 706, and node 708 to respond to the requests. This enables data set 741 and data set 742 to remain available even when a drive fails.

FIG. 9 illustrates data set mapping table 900 and drive mapping table 901 for protecting data stored across nodes in a distributed storage system when a node fails. Data set mapping table 900 is an example data structure that may be used by nodes 701-708 to determine whether a portion of a data set is stored thereon. In this example, data set mapping table 900 indicates all nodes on which a portion of data set 741 and data set 742 are stored. Additional data sets may be indicated in other examples. Data set mapping table 900 may, therefore, be the same across all of nodes 701-708. In other examples, data set mapping table 900 may only indicate data sets stored on the node storing data set mapping table 900. When nodes 702-708 receive the message from node 701 indicating that data set 741 and data set 742 were affected by a drive failure, nodes 702-708 may reference their respective copies of data set mapping table 900 to determine whether a portion of data set 741 and data set 742 are stored thereat. Nodes 704, 705, and 706 will determine that they each include a portion of data set 741 and Nodes 702, 706 and 708 will determine that they each include a portion of data set 742.

Drive mapping table 901 is an example data structure that may be stored at node 701 to indicate which drives at node 701 store portions of which data sets. When drive 711 fails, node 701 may reference drive mapping table 901 to determine which data sets had data stored on drive 711. In this example, data set 741 and data set 742 were stored on drive 711 but, if other data sets were also stored on drive 711, then drive mapping table 901 may indicate those sets as well. Likewise, drive mapping table 901 may include entries for other data sets stored on other drives, such as drive 712, at node 701. Nodes 702-708 may include similar drive mapping tables indicating which drives store which data sets thereat. For example, a drive mapping table at node 702 may indicate that drive 714 stores data set 742, specifically data 742D.

Figure 10:
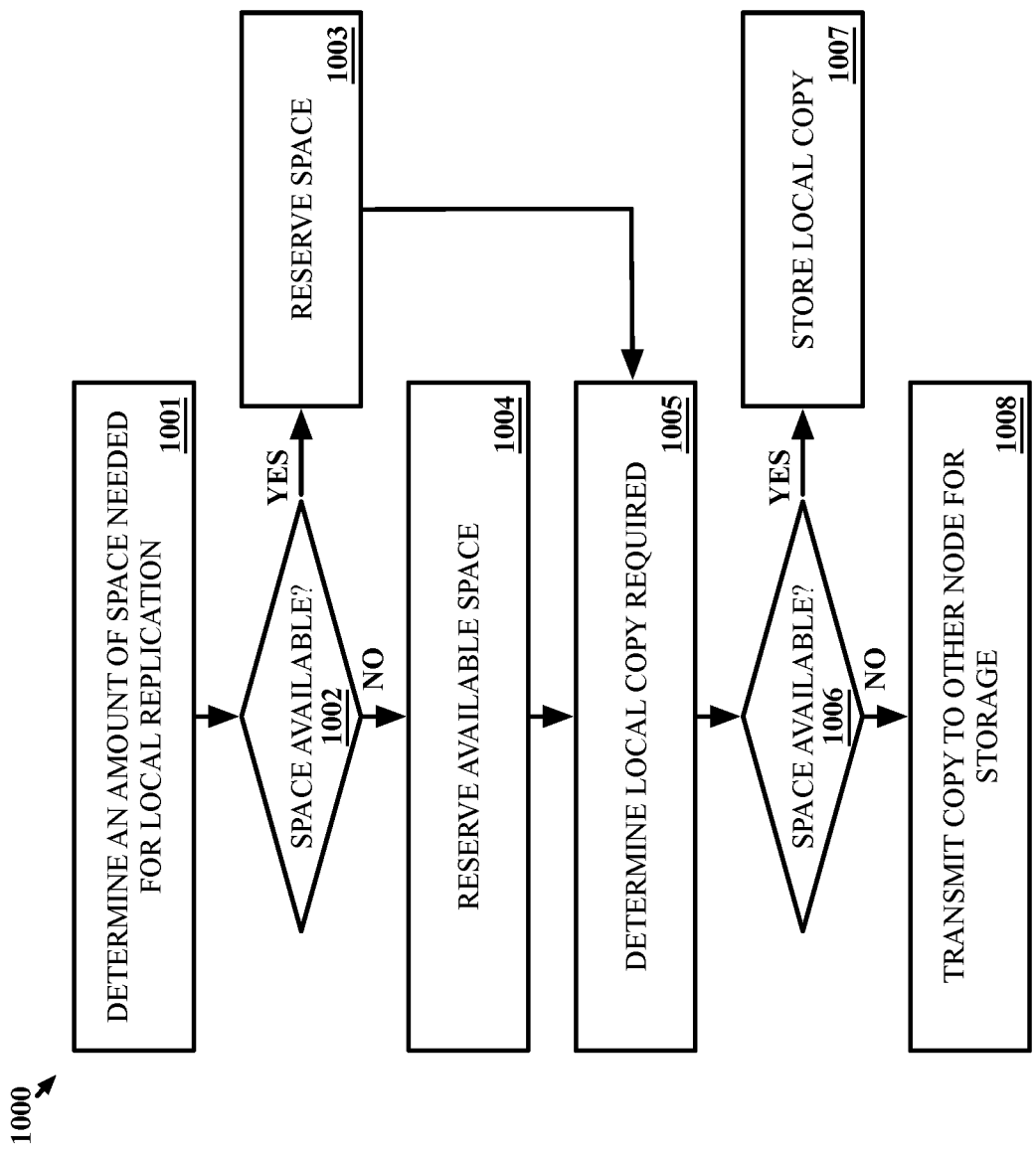
FIG. 10 illustrates an operation to protect data stored across nodes in a distributed storage system when a node fails.

FIG. 10 illustrates operation 1000 to protect data stored across nodes in a distributed storage system when a node fails. Operation 1000 is an example operation that may be performed by a node of a distributed storage system. In operation 1000, node determines an amount of storage space that may be needed to provide local backup copies of data stored at the node (step 1001). The amount of space may be based on historical statistics of nodes in the distributed storage system indicating how much storage was used for local backups of data when a remote drive fails. The node may determine the amount of storage space as being the maximum amount used in the historical statistics, may be an average amount of space, or may be based on some other calculation from the statistics. Other factors may also be considered, such as service levels for data stored at the node. For example, the node may determine the amount of space needed for local replication of data associated with more important service levels and not service levels of less importance.

If the determined amount of space is available (step 1002), the node reserves the amount of space on one or more drives at the node (step 1003). Reserving the space ensures the space will be available to store local data copies as described herein. In the determined amount of space is not available (step 1002), then the node may reserve whatever amount of space is available (step 1004). Reserving less than the determined amount of space may still be beneficial because, depending on how the amount of space was determined, a local copy may not require the full amount of space. When reserving less than the determined amount, the node may notify an administrator that less than the desired amount of space was reserved. The administrator may then add storage to the node or modify settings to enable the node to reserve more space. In some examples, the amount of space reserved may change as the node updates its determination based on new information.

After reserving space, the node determines that it should make a local copy of data stored on a drive (step 1005). For example, the node may have received a transmission from another node in the distributed storage system identifying a storage volume. Specifically, a storage volume that was stored, at least in part, on a drive that failed at the other node. In response to determining that the data should be copied, the node determines whether space is available on another local drive to store the copy (step 1006). If space is available, the node creates and stores the copy at the other local drive (step 1007). The space in which the copy is stored may be in the reserved space or may be at least partially outside of the reserved space if such space is available.

Preferably, for the sake of speed and lowering the probability that data will be lost due to a subsequent drive failure, the copy is stored to a local drive, as described above. However, if the node does not have enough available space on another drive to store the copy locally, the node may store the copy elsewhere. In operation 1000, the node transmits the copy to another node of the distributed storage system for storage (step 1008). While transmitting the copy over a network is not ideal from a speed perspective, ensuring data redundancy prior to when the failed drive can be recovered is beneficial even if the redundancy cannot be created in a local drive.

Figure 11:
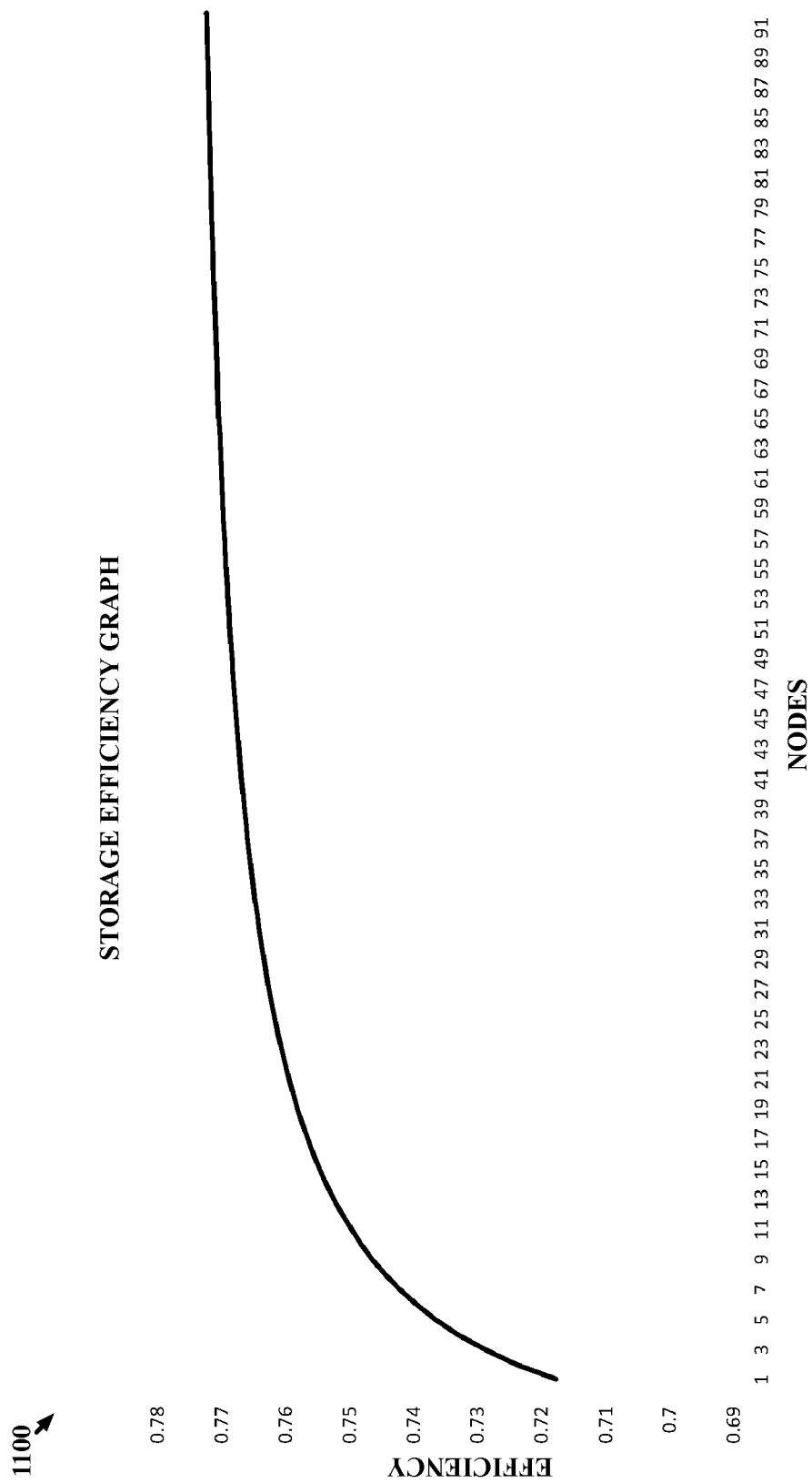
FIG. 11 illustrates a graph of storage efficiency when protecting data stored across nodes in a distributed storage system when a node fails.

FIG. 11 illustrates storage efficiency graph 1100 when protecting data stored across nodes in a distributed storage system when a node fails. Storage efficiency graph 1100 illustrates how the storage efficiency increases as more nodes are added to a data storage system. Storage efficiency is the ratio of the amount of storage necessary for achieving accessibility and protection goals to the given amount of data to be stored. The trend line of storage efficiency graph 1100 is based on a 7+2 erasure coding profile, which allows data to be striped across seven drives with two extra drives storing information (e.g., parity information) for recovering the data. The 7+2 profile allows for data to be recovered when up to 2 of the drives fail. In addition to the 7+2 profile, the distributed storage system represented by storage efficiency graph 1100 is using the local replication mechanism described above. This enables the distributed storage system to reach a storage efficiency of just over 0.77 while having a data loss tolerance comparable to a 7+3 distributed storage system because, once the local copy is produced, the distributed storage system effective becomes a 7+3 profile. Had a 7+3 profile been used for storage, the distributed storage system would only expect a storage efficiency around 0.70, which results in higher storage costs to store the same amount of data.

Figure 12:
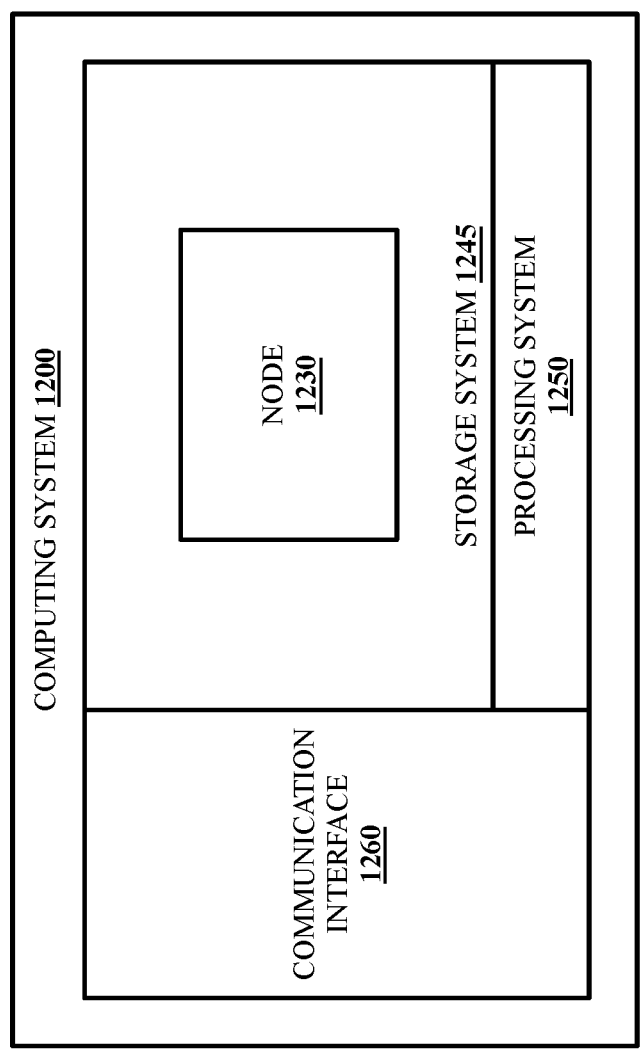
FIG. 12 illustrates a computing system for protecting data stored across nodes in a distributed storage system when a node fails.

FIG. 12 illustrates computing system 1200 for protecting data stored across nodes in a distributed storage system when a node fails. Computing system 1200 is representative of any computing system or systems with which the various operational architectures, processes, scenarios, and sequences disclosed herein can be implemented. Computing system 1200 is an example architecture for servers 181-184, although other examples may exist. Computing system 1200 may also be an example architecture for client 308. Computing system 1200 includes storage system 1245, processing system 1250, and communication interface 1260. Processing system 1250 is operatively linked to communication interface 1260 and storage system 1245. Communication interface 1260 may be communicatively linked to storage system 1245 in some implementations. Computing system 1200 may further include other components such as a battery and enclosure that are not shown for clarity.

Communication interface 1260 comprises components that communicate over communication links, such as network cards, ports, radio frequency (RF), processing circuitry and software, or some other communication devices. Communication interface 1260 may be configured to communicate over metallic, wireless, or optical links. Communication interface 1260 may be configured to use Time Division Multiplex (TDM), Internet Protocol (IP), Ethernet, optical networking, wireless protocols, communication signaling, or some other communication format-including combinations thereof. Communication interface 1260 may be configured to communicate with one or more web servers and other computing systems via one or more networks. Communication interface 1260 may be configured to communicate with others of servers 181-184 or clients.

Processing system 1250 comprises microprocessor and other circuitry that retrieves and executes operating software from storage system 1245. Storage system 1245 may include volatile and nonvolatile, removable, and non-removable media implemented in any method or technology for storage of information, such as computer readable instructions, data structures, program modules, or other data. Storage system 1245 may be implemented as a single storage device but may also be implemented across multiple storage devices or sub-systems. Storage system 1245 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no examples would storage media of storage system 1245, or any other computer-readable storage medium herein, be considered a transitory form of signal transmission (often referred to as "signals per se"), such as a propagating electrical or electromagnetic signal or carrier wave.

Processing system 1250 is typically mounted on a circuit board that may also hold the storage system. The operating software of storage system 1245 comprises computer programs, firmware, or some other form of machine-readable program instructions. The operating software of storage system 1245 comprises node 1230, which is an example of one of nodes 101-104. The operating software on storage system 1245 may further include an operating system, utilities, drivers, network interfaces, applications, or some other type of software. When read and executed by processing system 1250 the operating software on storage system 1245 directs computing system 1200 to perform state collection and master-node failover as described herein. Node 1230 may execute natively on processing system 1205 or the operating software may include virtualization software, such as a hypervisor, to virtualize computing hardware on which node 1230 executes.

Node 1230 is an example of any of nodes 101-104 and storage system 1245 may include drives 111-113, drives 121-123, or drives 131-133 for those nodes. In at least one example, node 1230 executes on processing system 1250. Node 1230 directs processing system 1250 to receive failure information from a subject node of a distributed storage system. The failure information indicates a failure of a drive storing first data of a data set in the subject node and the data set is distributed across nodes of the distributed storage system by a data protection mechanism. Node 1230 also directs processing system 1250 to determine that a local drive includes second data for the data set, identify a second local drive to which the second data should be copied, and create a copy of the second data on the second local drive to protect the data set from failure of the first local drive.

In another example, node 1230 directs processing system 1250 to detect failure of a local drive storing first data of a data set. The data set is distributed across nodes of a distributed storage system by a data protection mechanism. Node 1230 also directs processing system 1250 to broadcast failure information to other nodes of the distributed storage system. The failure information indicates the data set and each of one or more of the other nodes having second data of the data set creates copies the second data to a second drive therein to protect the data set from drive failure therein. Node 1230 further directs processing system 1250 to receive the second data from the group and recovering the first data to a new local drive using the second data.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method for temporarily protecting against data loss when a drive fails in a distributed storage system, the method comprising:
    determining a drive in a subject node of the distributed storage system has failed, wherein the drive stores first data of a data set distributed across nodes of the distributed storage system by a data protection mechanism;
    sending failure information from the subject node to other nodes of the distributed storage system, wherein the failure information indicates the data set;
    at the other nodes, in response to receiving the failure information, identifying a subset of the other nodes that also store a portion of the data set; and
    in each identified node of the subset, creating redundancy for second data of the data set stored at the identified node, wherein, for at least one node in the subset, creating the redundancy includes:
        transmitting a copy of the second data from the at least one node to another node of the distributed storage system; and
        storing the copy in a drive at the other node.

2. The method of claim 1, wherein, for at least one other node in the subset, creating the redundancy comprises:
    copying the second data from a local drive on which the second data is stored to another local drive.

3. The method of claim 1, comprising:
    deleting the copy when the first data has been recovered at the subject node.

4. The method of claim 1, wherein transmitting the copy occurs in response to determining the identified node lacks local space to store the copy.

5. The method of claim 1, comprising:
    determining an amount of storage space for creating local copies of data; and
    reserving the amount of storage space at nodes of the distributed storage system.

6. The method of claim 1, comprising:
    in the identified node:
        receiving a recovery notification from the subject node, wherein the recovery notification indicates the first data has been recovered to another drive at the subject node; and
        reducing a number of copies of the second data to one.

7. The method of claim 6, wherein reducing the number of copies comprises:
    enabling a copy of the second data to be overwritten.

8. The method of claim 1, comprising:
    accessing the second data in the identified node to recover the first data to a new remote drive of the subject node.

9. The method of claim 1, comprising:
    randomly selecting a group of nodes of the distributed storage system across which the data set should be stored; and
    storing the data set to the group.

10. The method of claim 9, wherein storing the data set uses one of the following data protection schemes:
    erasure coding;
    multiple complete copies; and
    Redundant Array of Independent Disks (RAID) 4 or 5.

11. The method of claim 9, wherein other data for another data set is also stored to the drive, the method comprising:
    broadcasting additional failure information from the subject node to the other nodes, wherein the additional failure information indicates the other data set.

12. The method of claim 10, comprising:
    randomly selecting a second group of nodes of the distributed storage system across which the other data set should be stored, wherein the second group is different than the group; and
    storing the other data set to the second group.

13. A apparatus for temporarily protecting against data loss when a drive fails in a distributed storage system, the apparatus comprising:
    one or more computer readable storage media;
    one or more processing systems operatively coupled with the one or more computer readable storage media; and program instructions stored on the one or more computer readable storage media that, when read and executed by the processing system, direct the apparatus to:

receive failure information from a subject node of the distributed storage system, wherein the failure information indicates a failure of a drive storing first data of a data set in the subject node, and wherein the data set is distributed across nodes of the distributed storage system by a data protection mechanism;

determine that a local drive includes second data for the data set;

identify a second local drive to which the second data should be copied; and create a copy of the second data on the second local drive to protect the data set from failure of the first local drive;

receive a recovery notification from the subject node, wherein the recovery notification indicates the first data has been recovered to another drive at the subject node; and enabling the copy to be overwritten.

14. The apparatus of claim 13, wherein the program instructions direct the apparatus to:

receive the second data; and store the second data on the local drive.

15. The apparatus of claim 14, wherein the data set is erasure coded for distribution across the nodes of the distributed storage system.

16. The apparatus of claim 13, wherein the program instructions direct the apparatus to:

access the second data to recover the first data to a new remote drive of the subject node.

17. The apparatus of claim 13, wherein the program instructions direct the apparatus to:

randomly select a group of nodes of the distributed storage system across which the data set should be stored; and store the data set to the group.

18. The apparatus of claim 13, wherein the program instructions direct the apparatus to:

before receiving the failure information, determine an amount of storage space for creating local copies; and reserve the amount of storage space on the second local drive.

19. A apparatus for temporarily protecting against data loss when a drive fails in a distributed storage system, the apparatus comprising:

one or more computer readable storage media;

one or more processing systems operatively coupled with the one or more computer readable storage media; and program instructions stored on the one or more computer readable storage media that, when read and executed by the processing system, direct the apparatus to:

detect failure of a local drive storing first data of a data set, wherein the data set is distributed across nodes of the distributed storage system by a data protection mechanism;

broadcast failure information to other nodes of the distributed storage system, wherein the failure information indicates the data set, wherein each of one or more of the other nodes having second data of the data set creates copies the second data to a second drive therein to protect the data set from drive failure therein;

receive the second data from the group;

recover the first data to a new local drive using the second data; and transmit a recovery notification to the group indicating the first data has been recovered, wherein the group enables the copies of the second data to be overwritten.

20. The apparatus of claim 19, wherein to detect the failure of the local drive, the program instructions direct the apparatus to:

determine data being written to or read from the local drive includes above a threshold amount of data errors.

* * * * *